Patented July 3, 1951

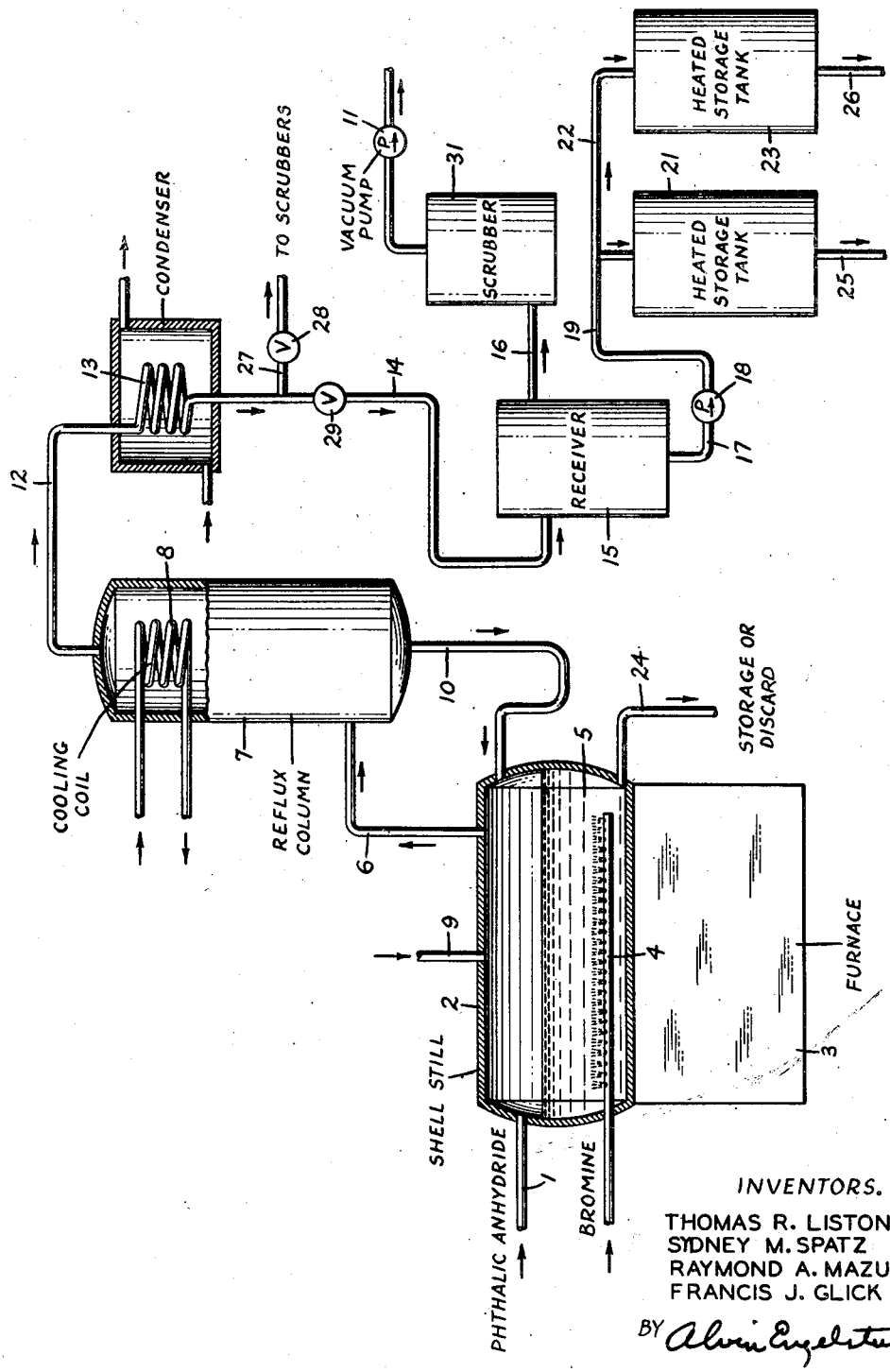

2,558,862

UNITED STATES PATENT OFFICE 2,558,862

MANUFACTURE OF BROMINATED PHTHALIC ANHYDRIDE

Thomas R. Liston, Hamburg, Sydney M. Spatz, Middletown, and Raymond A. Mazur and Francis J. Glick, Buffalo, N. Y., assignors to Allied Chemical & Dye Corporation, New York, N. Y., a corporation of New York Application June 22, 1948, Serial No. 34,543

9 Claims. (Cl. 260—341)

This invention relates to a process for preparing brominated derivatives of phthalic anhydride and more particularly refers to a new and improved process for the production of monobromophthalic anhydride by direct bromination of phthalic anhydride.

It has been proposed according to U. S. P. 2,211,465 to effect bromination of phthalic acid by acidifying an aqueous mixture of sodium phthalate, sodium bromide and sodium hypochlorite with hydrochloric acid. This results in the liberation of hydrobromic acid and hypochlorous acid, which then oxidizes the hydrobromic acid to hypobromous acid, which latter is the effective brominating agent. However, the process is involved, expensive and highly corrosive to equipment and yields chlorinated phthalic acids as contaminants, which are practically impossible to separate from the desired monobrominated phthalic acid.

The formation of undesired chlorinated phthalic acid is avoided according to U. S. P. 2,394,268 by adding bromine to an aqueous solution of a neutral salt of phthalic acid while maintaining the solution neutral by adding alkali in an amount not materially exceeding that required to neutralize the hydrobromic acid liberated in the reaction. The patent purports to obviate the use of an oxidizing agent such as sodium hypochlorite and sodium hypobromite which are required in the process disclosed in U. S. P. 2,211,465. Although these processes represent the latest developments in the art, they are cumbersome and expensive for manufacturing monobrominated phthalic acid and the corresponding anhydride.

An object of the present invention is to provide an economical, commercially practical method of producing high yields of brominated derivatives of phthalic anhydride, particularly monobrominated phthalic anhydride, by the direct bromination of phthalic anhydride.

Other objects and advantages of the present invention will be apparent from the following description and accompanying drawing.

After extensive experimentation in an attempt to brominate phthalic anhydride directly with elementary bromine in the absence of catalysts and in the presence of various agents such as antimony trichloride, iodine, sulfur, benzoyl peroxide, powdered copper and ultraviolet light and under varying conditions of operation, we have discovered that monobrominated phthalic anhydride can be obtained in excellent yield by a simple, inexpensive process, which comprises brominating liquid phthalic anhydride with elementary bromine in the presence of a brominating catalyst comprising metallic iron or a compound containing iron. The brominated phthalic anhydride uncontaminated by chlorine compounds may be recovered from the reaction mixture by fractional distillation.

An important feature of the invention is the direct production of brominated phthalic anhydride from elementary bromine and phthalic anhydride in the presence of a catalyst without the aid of solvents, alkali, acid, oxidizing agent or other reagents.

A specific embodiment of the invention comprises adding a brominating catalyst containing iron to phthalic anhydride in an amount between 1% and 10% iron by weight of the phthalic anhydride, maintaining the mixture of phthalic anhydride and brominating catalyst at a temperature in the range of 190° to 220° C., introducing elementary bromine in an amount from about 10% to 40% in excess over the stoichiometric amount of bromine required for monobromination of the phthalic anhydride into the mixture at a rate not materially greater than the rate at which it is consumed in the mixture, adding finely divided metallic copper to the reaction mixture thereby effecting removal of free bromine therein, and separating monobrominated phthalic anhydride from the reaction mixture by fractionation.

The accompanying drawing represents a diagrammatic flow sheet of one method of carrying out the present invention.

Referring to the drawing, phthalic anhydride is charged through conduit 1 into shell still 2 supported on furnace 3 to a level of about ½ to ⅔ the height of vessel 2. A finely divided brominating catalyst containing iron may be admixed with the phthalic anhydride prior to introduction in shell still 2 or added through conduit 9 to the anhydride. Heat is applied to the bottom of shell still 2 by means of furnace 3 until phthalic anhydride in the vessel attains the desired temperature preferably within the range of 170° to 250° C. Elementary bromine is introduced through perforated pipe 4 into the lower portion of molten phthalic anhydride 5 contained in shell still 2 at a rate not substantially in excess of the rate at which it is consumed by phthalic anhydride. Unreacted bromine in vapor form together with other vaporous components pass from the top of shell still 2 through vapor release line 6 into the lower portion of reflux column 7, which may be any suitable fractionating column. As the vapors pass upwardly to the top of reflux column 7 they come in indirect heat exchange with water flowing through cooling coil 8 thereby condensing to form reflux condensate which flows downwardly through reflux column 7 and returns by gravity through reflux leg 10 into shell still 2. The flow of bromine into the body of phthalic anhydride 5 continues until an amount in slight excess of the theoretical amount required to form monobromophthalic anhydride is introduced. During this period of reaction the temperature of the molten phthalic anhydride is maintained within the desired range and the entire apparatus is under atmospheric pressure. Unreacted bromine and hydrogen bromide leaving the top of reflux column 7 pass through line 12, condenser 13, thence through line 27 and valve 28 to conventional scrubbers to trap the bromine and hydrogen bromide. To insure completion of reaction between bromine and phthalic anhydride, heating of the reaction mixture in shell still 2 is continued for about an hour or two after the discontinuance of bromine introduction into the reaction mass. Powdered copper may then be added through conduit 9 to the reaction mixture contained in shell still 2 for the purpose of eliminating free bromine therein.

The reaction mixture is permitted to cool to a temperature of about 125° C., and a vacuum of approximately 20 mm. mercury absolute pressure is then imposed on the system by means of vacuum pump 11 followed by the application of heat to the bottom of shell still 2 to effect distillation of the liquid contents. The vaporous components pass upwardly through conduit 6 into fractionating column 7 and thence from the top of column 7 through line 12, condenser 13, line 14, valve 29 into receiver 15. If desired, partial cooling may be effected by cooling coil 8 at the top of column 7 for the purpose of obtaining sharper separation of the vaporous constituents undergoing fractionation. A continuous vacuum is maintained on the system by the suction of vacuum pump 11 following line 16 connected to receiver 15. A scrubber 31 is desirably inserted between receiver 15 and vacuum pump 11 to guard the pump against product vapors. Liquid condensate accumulating in the bottom of receiver 15 discharges through line 17 and pump 18 through line 19 into storage tank 21 or through line 22 into storage tank 23. Tanks 21 and 23 are preferably heated to keep their contents molten and capable of being withdrawn from respective bottoms outlets 25 and 26. The first fraction distilling from shell still 2 boiling below 175° C. at 20 mm. mercury absolute pressure as measured at the top of fractionating column 7 is discharged into storage tank 21. The next fraction boiling between 175° C. and 220° C. discharge into storage tank 23. The residue, that is the fraction boiling above 220° C. at 20 mm. mercury absolute pressure, is withdrawn from the bottom of shell still 2 through line 24 to storage or discard. Low boiling distillate collected in storage tank 21 and consisting primarily of unreacted phthalic anhydride together with small amounts of monobromophthalic anhydride may be returned to shell still 2 as part of the charge for a subsequent operation. The intermediate distillate collected in storage tank 23 is rich in monobromophthalic anhydride with relatively small amounts of unreacted phthalic anhydride and polybromophthalic anhydride. A more concentrated monobromophthalic anhydride may be obtained by further fractionation of this intermediate fraction, and in this event unreacted phthalic anhydride is returned to shell still 2 for further conversion. Residue discharged from still 2 through line 24 contains predominantly dibromophthalic anhydride and other polybromophthalic anhydrides, and iron, copper and compounds of iron and of copper.

We have found that metallic iron and ferric chloride are particularly effective in promoting the reaction between elementary bromine and phthalic anhydride to produce monobromophthalic anhydride. Examples of other suitable iron compounds which may be employed in the practice of our invention are inorganic iron compounds such as ferrous and ferric oxides, hydroxides, bromides, iodides, fluorides, sulfates, phosphates; iron salts of organic acids, e. g. ferrous and ferric acetates, oxalates and phthalates. Iron salts of powerful oxidizing agents for example ferric nitrate and ferric persulfate are less preferred bromination promoters since they may also act as oxidizing agents which under the reaction conditions are sufficiently energetic to effect harmful oxidation or decomposition of phthalic anhydride or its brominated derivatives.

Only a small amount of iron or iron compound, for example 1% of metallic iron based on the weight of phthalic anhydride, is required to catalyze the bromination of molten phthalic anhydride by elementary bromine. The use of larger amounts of iron catalyst generally accelerates the rate of bromination. Thus, for example the time required to effect monobromination of phthalic anhydride at 210° C. decreases in proportion to the percentage of iron powder added as follows: 1%=20 hours; 3%=10 hours; 5%=5 hours; and 10%=3 hours. We prefer to employ the iron bromination catalyst in an amount between 1% and about 10% by weight of the phthalic anhydride charge, calculated as metallic iron. Smaller proportions of iron catalyst produce a relatively weak stimulation of the bromination reaction and provide a progressively slower and hence less preferred reaction. Larger amounts of catalyst, in excess of 10% iron by weight of phthalic anhydride, are less preferred since an inordinately large amount of additional iron catalyst is required to effect a further material reduction in time required to complete the bromination reaction. More important, however, is the tendency by the use of such large amounts of iron catalyst to promote the formation of polybrominated derivatives of phthalic anhydride and other undesired side reactions, thereby reducing the yield of monobromophthalic anhydride and the facility and efficiency with which the desired product can be recovered from the bromination mass by fractional distillation.

According to the present invention, the bromination may be performed by introducing elementary bromine into molten phthalic anhydride in which iron or an iron compound is present as a bromination catalyst. It is preferred to conduct the bromination at a temperature about 170° C. or higher, since at materially lower temperatures the reaction is unduly slow. At temperatures above 250° C. under atmospheric pressure, there occurs an accelerated rate of sublimation of phthalic anhydride which can cause difficulties in mechanical operation, by plugging of the reflux condenser, unless the latter is maintained at a temperature above the melting point of the sublimate. It is especially preferred to conduct the bromination at temperatures from about 190° C. to about 220° C., since such temperatures provide practically optimum rates of bromination with excellent mechanical operating conditions under atmospheric pressure.

Another important factor in the operation of our process in accordance with the present invention resides in the rate of addition of bromine to the mixture of molten phthalic anhydride and iron catalyst. When a large amount of bromine is introduced at once or is permitted to accumulate in the reaction mixture, the reaction temperature is rapidly lowered by the absorption from the mixture of heat required to vaporize liquid bromine present and returned by the reflux condenser with the consequence that the bromination reaction may be seriously retarded or even practically stopped depending on the resulting temperature in the reaction mass. Furthermore, the reflux produced from large amounts of bromine accumulated in the reaction mixture lowers the partial pressure of phthalic anhydride thereby inducing sublimation of considerable amounts of phthalic anhydride thus tending to aggravate mechanical difficulties of operation.

Although we have obtained yields of over 50% of monobromophthalic anhydride by mixing equimolecular proportions of bromine and phthalic anhydride we have found that substantially improved yields are obtained when employing a small excess of bromine, i. e. from about 10% to about 40%, over the stoichiometric amount for monobromination. The use of an amount of bromine greater than the 40% excess increases the proportion of polybromophthalic anhydride formed at the expense of monobromophthalic anhydride and hence is less desirable for monobromination.

Powdered metallic copper may be added at the conclusion of the bromination reaction to combine with and remove the last traces of free bromine in the mixture as well as bromine liberated from unstable iron bromides formed, which otherwise tends to distill over and imparts color to the distillate of monobromophthalic anhydride. After treatment with copper the mixture may be filtered to remove the copper bromides and other solids. As a result of the copper treatment a less colored bromophthalic anhydride is obtained. An alternative method of removing bromine from the reaction mixture comprises passing a gas such as air through the hot bromination mass. This latter procedure is comparatively time consuming, requiring about 3–4 hours at about 200° C. compared with less than ½ hour when copper is employed.

The reaction mass resulting from the bromination of phthalic anhydride in accordance with the present invention contains predominantly monobromophthalic anhydride and minor amounts of polybromophthalic anhydride together with unreacted phthalic anhydride. In some instances this mixture may be utilized commercially without further separation or treatment. Generally, it is desirable to separate the monobromophthalic anhydride in substantially pure state or to produce from the reaction mass a fraction rich in monobromophthalic anhydride. Although we do not desire to limit ourselves to any specific procedure for further treatment of the reaction mass, we have found that a fraction rich in monobromophthalic anhydride may be recovered from the bromination mixture by fractional distillation under reduced pressure.

The fraction boiling up to 175° C. under 20 mm. of mercury absolute pressure consists largely of unreacted phthalic anhydride together with monobrominated phthalic anhydride, which constitutes as much as 10 to 15% of the theoretical yield of monobromophthalic anhydride obtained in the bromination reaction. This fraction may be subjected to further treatment for the separation of monobromophthalic anhydride from the phthalic anhydride, and the latter returned to the bromination reaction. Ordinarily, it is more convenient to reuse the fraction without further separation together with fresh phthalic anhydride in a subsequent bromination rather than try to recover its content of monobromophthalic anhydride. The fraction boiling from about 175° to 220° C. under 20 mm. mercury absolute pressure represents a product composed largely of monobromophthalic anhydride in the form of a mixture of 3- and 4-bromophthalic anhydrides, together with some dibrominated derivatives of phthalic anhydride and unreacted phthalic anhydride. Technical monobromophthalic anhydride thus obtained is suitable directly for use in the manufacture of certain phthalein dyestuffs employed in cosmetics. If a purer form of monobromophthalic anhydride is desired it may be obtained by further treatment of the technical product, as for example by fractionating out a relatively narrow boiling fraction from the fraction distilling between 175° to about 220° C. Material boiling above 220° C. under 20 mm. mercury absolute pressure contains dibromophthalic anhydride as well as higher brominated derivatives of phthalic anhydride.

The following examples illustrate the invention, the parts being by weight:

*Example 1.*—A mixture of 222 parts equivalent to 1.5 mols of technical phthalic anhydride and 11.1 parts of 60-mesh iron powder was heated to 200–210° C. in a glass vessel provided with a reflux condenser. 320 parts equivalent to 2 mols of liquid bromine were added dropwise and portionwise during about 7½ hours while agitating and maintaining the reaction mixture at 200–210° C. The rate of bromine addition was controlled to avoid accumulation of bromine in the vessel as indicated by pronounced reflux of bromine or a marked lowering of the reaction temperature. After the addition of bromine was complete the mixture was further agitated for about 2 hours at 200–210° C. to insure completion of the bromination reaction. 7 parts of 60-mesh copper powder were then added and the contents of the vessel agitated for an additional ½ hour. A yield of approximately 93% monobromophthalic anhydride based on the theoretical yield obtainable was produced.

A series of tests employing materials other than iron compounds were conducted in an attempt to brominate phthalic anhydride with elementary bromine in a manner as described above. The following agents were substituted for the iron catalyst: antimony trichloride, sulfur, benzoyl peroxide, powdered copper, and ultraviolet light. Bromination of the phthalic anhydride did not occur under these conditions even when the rate of bromine addition was slowed and heating period was extended to 15 and 20 hours.

*Example 2.*—240 parts equivalent to 1½ mols of bromine were added portionwise during 10 hours to an agitated mixture of 222 parts equivalent to 1½ mols of phthalic anhydride and 19.5 parts of anhydrous ferric chloride in a glass vessel provided with a glass reflux condenser while maintaining the temperature of the reaction mixture between 200-210° C. When the addition of bromine was complete the contents of the vessel were further agitated for about 1 hour at 200° to 210° C. A yield of about 60% monobromophthalic anhydride based on the theoretical yield obtainable was produced.

Example 3.—240 parts equivalent to 1½ mols of bromine were added portionwise for about 5 hours to a mixture of 222 parts equivalent to 1½ mols of phthalic anhydride and 11.1 parts of 60-mesh powdered iron at 200° to 210° C. The apparatus and procedure was the same as in Example 2. After the addition of bromine was complete the mixture was further agitated at 200°–210° C. for about 2 hours. A yield of about 63% monobromophthalic anhydride based on the theoretical yield obtainable was produced.

Example 4.—240 parts equivalent to 1½ mols of bromine were added portionwise during 20 hours to a mixture of 222 parts equivalent to 1½ mols of phthalic anhydride and 2.2 parts of 60-mesh powdered iron at a temperature at 200°–210° C. in a manner similar to that in Example 3. After the addition of bromine was complete the mixture was further agitated at 200–210° C. for about 2 hours. A yield of approximately 67% monobromophthalic anhydride based on the theoretical yield obtainable was produced.

We claim:

1. A process for catalytically brominating phthalic anhydride with elementary bromine to produce brominated phthalic anhydride which comprises maintaining a mixture of phthalic anhydride and a brominating catalyst selected from the group consisting of metallic iron, inorganic iron compounds and iron salts of organic acids at a temperature in the range of 170°–250° C., introducing elementary bromine into the mixture at a rate not materially greater than the rate at which it is consumed in the mixture and separating from the reaction products a fraction boiling below about 175° C. at 20 mm. mercury absolute pressure and subsequently brominating said fraction in admixture with additional phthalic anhydride.

2. A process for catalytically brominating phthalic anhydride with elementary bromine to produce brominated phthalic anhydride which comprises maintaining a mixture of phthalic anhydride and a brominating catalyst selected from the group consisting of metallic iron, inorganic iron compounds and iron salts of organic acids in an amount between 1% and 10% iron by weight of phthalic anyhdride at a temperature in the range of 190°–220° C., introducing elementary bromine into the mixture at a rate not materially greater than the rate at which it is consumed in the mixture, fractionating the reaction mass into a fraction boiling below about 175° C., a fraction between about 175° C. and 220° C. and a fraction boiling above about 220° C. at 20 mm. mercury absolute pressure and returning said fraction boiling below 175° C. together with additional phthalic anhydride for further bromination reaction.

3. A process for catalytically brominating phthalic anhydride with elementary bromine to produce brominated phthalic anhydride which comprises adding a brominating catalyst selected from the group consisting of metallic iron, inorganic iron compounds and iron salts of organic acids to phthalic anhydride in an amount between 1% and 10% iron by weight of phthalic anhydride, maintaining the mixture of phthalic anhydride and brominating catalyst at a temperature in the range of 190°–220° C., and introducing elementary bromine in an amount from about 10% to 40% in excess over the stoichiometric amount of bromine required for monobromination of phthalic anhydride into the mixture at a rate not materially greater than the rate at which it is consumed in the mixture.

4. A process for catalytically brominating phthalic anhydride with elementary bromine to produce brominated phthalic anhydride which comprises adding a brominating catalyst selected from the group consisting of metallic iron, inorganic iron compounds and iron salts of organic acids to phthalic anhydride in an amount between 1% and 10% iron by weight of phthalic anhydride, maintaining the mixture of phthalic anhydride and brominating catalyst at a temperature in the range of 190°–220° C., introducing elementary bromine in an amount from about 10% to 40% in excess over the stoichiometric amount of bromine required for monobromination of phthalic anhydride into the mixture at a rate not materially greater than the rate at which it is consumed in the mixture, adding finely divided metallic copper to the reaction mixture thereby effecting removal of free bromine therein and separating a fraction rich in monobromophthalic anhydride from the reaction mixture by fractionation.

5. A process for catalytically brominating phthalic anhydride with elementary bromine to produce brominated phathalic anhydride which comprises adding finely divided metallic iron to phthalic anhydride in an amount between 1% and 10% iron by weight of phthalic anhydride, maintaining the mixture of phthalic anhydride and brominating catalyst at a temperature in the range of 190° C. to 220° C. and introducing elementary bromine in an amount from 10% to 40% in excess over the stoichiometric amount of bromine required for monobromination of phthalic anhydride into the mixture at a rate not materially greater than the rate at which it is consumed in the mixture.

6. A process for catalytically brominating phthalic anhydride with elementary bromine to produce brominated phthalic anhydride which comprises adding anhydrous ferric chloride to phthalic anhydride in an amount between 1% and 10% iron by weight of phthalic anhydride, maintaining the mixture of phthalic anhydride and brominating catalyst at a temperature in the range of 190° C. to 220° C. and introducing elementary bromine in an amount from 10% to 40% in excess over the stoichiometric amount of bromine required for monobromination of phthalic anhydride into the mixture at a rate not materially greater than the rate at which it is consumed in the mixture.

7. A process for catalytically brominating phthalic anhydride with elementary bromine to produce brominated phthalic anhydride which comprises introducing elementary bromine into molten phthalic anhydride in the presence of a brominating catalyst selected from the group consisting of metallic iron, inorganic iron compounds and iron salts of organic acids, adding finely divided metallic copper to the reaction mixture thereby effecting removal of free bromine therein and separating a fraction rich in monobromophthalic anhydride from the reaction mixture.

8. A process for catalytically brominating phthalic anhydride with elementary bromine to produce brominated phthalic anhydride which comprises adding finely divided metallic iron to phthalic anhydride in an amount between 1% and 10% iron by weight of phthalic anhydride, maintaining the mixture of phthalic anhydride and brominating catalyst at a temperature in the range of 190°–220° C., introducing elementary bromine in an amount from about 10% to 40% in excess over the stoichiometric amount of bromine required for monobromination of phthalic anhydride into the mixture at a rate not materially greater than the rate at which it is consumed in the mixture, adding finely divided metallic copper to the reaction mixture thereby effecting removal of free bromine therein and separating a fraction rich in monobromophthalic anhydride from the reaction mixture by fractionation.

9. A process for catalytically brominating phthalic anhydride with elementary bromine to produce brominated phthalic anhydride which comprises adding anhydrous ferric chloride to phthalic anhydride in an amount between 1% and 10% iron by weight of phthalic anhydride, maintaining the mixture of phthalic anhydride and brominating catalyst at a temperature in the range of 190°–220° C., introducing elementary bromine in an amount from about 10% to 40% in excess over the stoichiometric amount of bromine required for monobromination of phthalic anhydride into the mixture at a rate not materially greater than the rate at which it is consumed in the mixture, adding finely divided metallic copper to the reaction mixture thereby effecting removal of free bromine therein and separating a fraction rich in monobromophthalic anhydride from the reaction mixture by fractionation.

THOMAS R. LISTON.
SYDNEY M. SPATZ.
RAYMOND A. MAZUR.
FRANCIS J. GLICK.

REFERENCES CITED

The following references are of record in the file of this patent:

UNITED STATES PATENTS

| Number | Name | Date |
|---|---|---|
| 2,028,383 | Dvornikoff | Jan. 21, 1936 |
| 2,211,465 | Jewel et al. | Aug. 13, 1940 |
| 2,394,268 | Spencer | Feb. 5, 1946 |
| 2,429,985 | Blume et al. | Nov. 4, 1947 |
| 2,452,154 | Ross | Oct. 26, 1948 |

FOREIGN PATENTS

| Number | Country | Date |
|---|---|---|
| 50,177 | Germany | Jan. 10, 1889 |

OTHER REFERENCES

Norris, Experimental Organic Chemistry, 1924, page 147.

Egloff, Catalysis, 1940, page 590.

Chemical Abstracts, vol. 36, 1942, page 460.

Groggins, Unit Processes in Organic Synthesis, page 227.